United States Patent [19]

Choi et al.

[11] Patent Number: 5,124,890
[45] Date of Patent: Jun. 23, 1992

[54] DISPLAY BOARD ILLUMINATED BY REFRACTED LIGHT

[76] Inventors: Hang-Jun Choi, Ra-dong 1103, SamHo Garden Apt. 438, Banpo-Dang Seocho-Ku; Kil-Woong Ki, 426-16 Sungnae-3-Dong, Dangdong-Ku, both of Seoul, Rep. of Korea

[21] Appl. No.: 663,529

[22] Filed: Mar. 4, 1991

Related U.S. Application Data

[63] Continuation-in-part of Ser. No. 482,608, Feb. 21, 1990, abandoned.

[51] Int. Cl.$^5$ ............................................. G01D 11/28
[52] U.S. Cl. ...................................... 362/27; 362/31; 362/330; 362/244; 362/812; 40/546
[58] Field of Search .................. 362/26, 27, 31, 32, 362/330, 244, 812; 40/546

[56] References Cited

U.S. PATENT DOCUMENTS

| | | | |
|---|---|---|---|
| 2,214,209 | 9/1940 | Triplett | 362/27 |
| 2,347,665 | 5/1944 | Christensen et al. | 362/31 |
| 2,623,313 | 12/1952 | Fuchs | 362/27 |
| 4,714,983 | 12/1987 | Lang | 362/27 |
| 4,947,300 | 8/1990 | Wen | 362/27 |

FOREIGN PATENT DOCUMENTS 834837  3/1952  Fed. Rep. of Germany ........ 362/31

OTHER PUBLICATIONS

Pearson, Henry "Piping Light with Acrylic Materials", Modern Plastics, Aug. 1946, pp. 123–127.

*Primary Examiner*—James C. Yeung
*Attorney, Agent, or Firm*—Armstrong, Nikaido, Marmelstein, Kubovcik & Murray

[57] ABSTRACT

This display board consists of the transparent acrylic plastic plates in which surface desired letters or pictures are grooved, and a panel made by fitting together a number of the bricks of transparent acrylic plastic. The light receiving edges of the plate, and the light receiving edge and the light emerging edge of the brick are sandpapered in order to make lights enter and emerge from the edge to maximum extent. The light receiving edges of the plates and bricks are colored with a desired to produce a colored light. When light-bulbs with refractors properly positioned at the light receiving edges of the plate and the brick are turned on, the colored lights withthe same color of the dye coloured the edges will emerge from the grooves cut in the plate and from the emerging edge of the brick. For uniform illuminant intensity of the grooves cut in the plate, the depths of grooves are adjusted to be deeper around the center of the plate than around its periphery. An illumination controller is used to control the sequence, interval and duration of an illumination for the most colorful illuminant commercial display. This display board has wide applications for use as a larger scale outdoor signboard, interior decoration, and tail-light of a car.

3 Claims, 6 Drawing Sheets

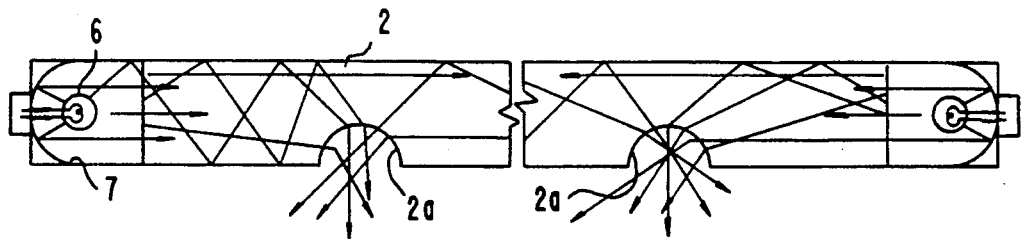
FIG.5A
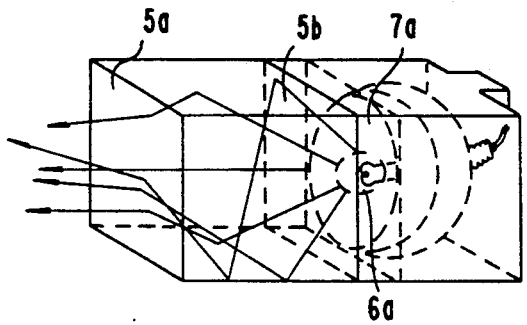
FIG.5B
FIG.6
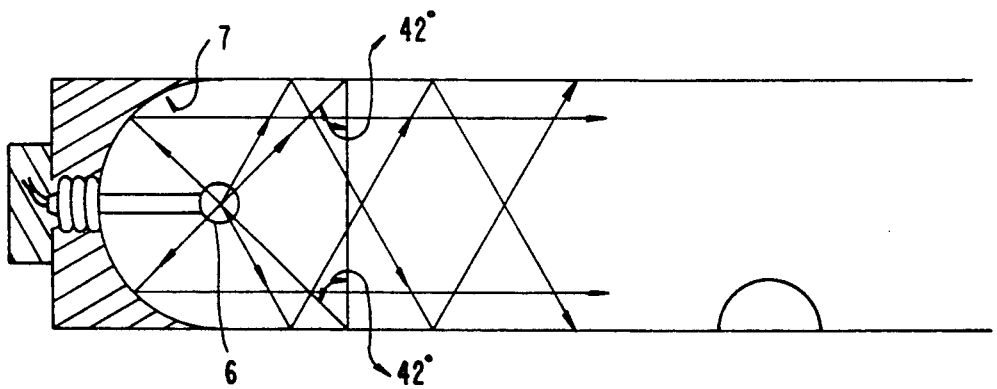
FIG.7
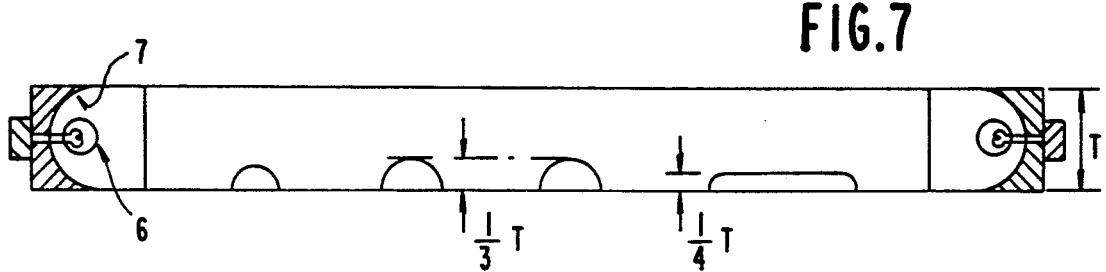

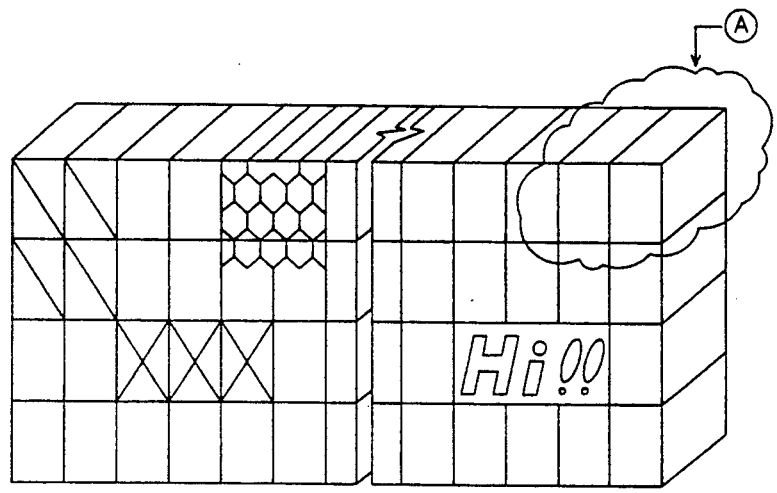
FIG. 9A
FIG. 9B
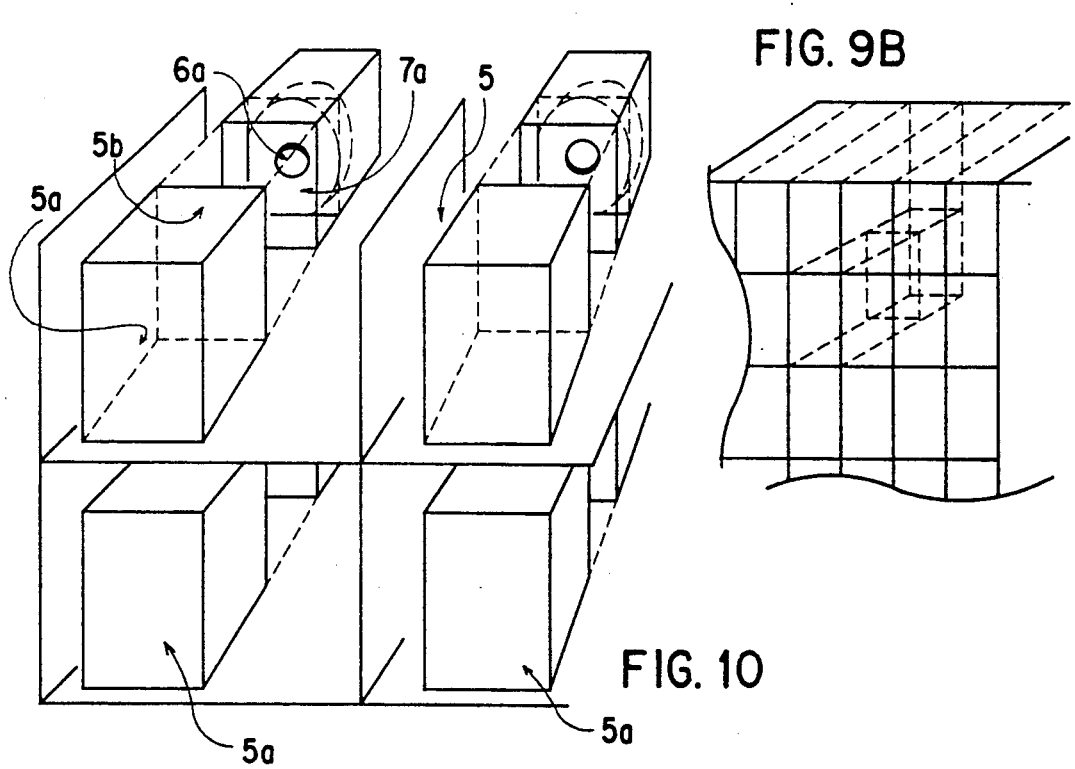
FIG. 10

DISPLAY BOARD ILLUMINATED BY REFRACTED LIGHT

RELATED APPLICATION

This is a continuation-in-part of my application Ser. No. 482,608, filed Feb. 21, 1990 now abandoned.

BACKGROUND OF THE INVENTION

1. FIELD OF THE INVENTION

This invention is related to an electric illuminant display board which is based on the characteristics of light, reflection and refraction. The display board consists of two major parts—a front and a back part. Each part has its own peculiar form of display which is the most convenient, durable, and inexpensive. The front part is designed to create an illuminant display with a transparent acrylic plastic plate in which letters or pictures are grooved. The back part is designed to create an illuminant display by fitting together solid brick pieces of transparent acrylic plastic. These two forms are used in an electric illuminant display either independently or jointly in combination.

2. DESCRIPTION OF THE PRIOR ART

Neon display signs have usually been used to display figures by illuminating light. However, it is difficult to shape various delicate figures with neon tubes. Other disadvantages with neon tubes are their fragility, high cost, high wattage consumption, both for installation and for maintenance. There are some of the illumination signboards made of a transparent plate. However, they are lack of background illumination, not specific in location of a light source, limited in size, and complicated in manufacturing.

REFERENCES CITED

The following references are of record in the file of this patent;

| | | | | |
|---|---|---|---|---|
| 1950548 | 3/1934 | FULLER. JR | 362/31 | USA |
| 2623313 | 12/1952 | FUCHS | 40/546 | USA |
| 4918578 | 4/1990 | THOMPSON | 362/31 | USA |
| 1930359 | 10/1993 | HILGENBERG | 40/546 | USA |
| 89517 | 10/1937 | EPOC | 40/546 | FRANCE |
| 3208162 | 10/1982 | TEDX | 362/31 | GERMANY |

SUMMARY OF THE INVENTION

The object of this invention is to provide an electric illuminant display board which is simple to make, easy to handle, convenient and endurable in use, precise and colorful in expression, and yet inexpensive, without bothering with a size. The electrical illumination display board (hereafter it is called display board for simplification) consists of two major parts. One is a front part and the other is a back part. The front part is positioned in front of the display board and consists of a few component parts below:

A transparent acrylic plastic plate in which letters, designs, pictures, etc. are grooved as desired. This transparent acrylic plastic plate is hereafter called the plate for simplification. For the depth effect, the plates may be used up to five maximum when required. It is essential to sandpaper the edges of the plate where light is projected to in order to attain a maximum intensity of illumination. For uniform intensity of illumination on the surface of the plate, the optimum depths of the grooves cut in the surface of the plate are differentiated to be one quarter of the thickness of the plate around the periphery of the plate and one third of the thickness around its center. The reason is that it is not easy to make the surface of a very large plastic plate concave shaped.

It is important to select a precise location of a bulb to make the rays of light from a bulb enter the plate to a maximum degree. The optimum position of a light source is the point where an extended straight line going through the center of the plate in parallel to an edge of the plate meets a straight line that makes an angle of 42° with the surface of an edge at the end of the edge where the rays of incident light enter as shown in the FIG. 6. The shape of the reflector attached to a light bulb is semi-circular with the diameter equal to the thickness of the plate as shown in the FIG. 8. The reflector is connected to the plate with rectangular shaped box. The inner surface of the box is coated with a reflective material. The structure of the light source is as shown in the FIG. 8. The reflector is made in a mold with a heat proof plastic material and its inner surface is coated with a reflective coating material. To produce a colored light the edges of the plate are colored with a desired dye. A dye is used because it is more durable to heat and better in penetration ratio of rays of light than a colored film. The dye on the edge is easy to erase by using liquid alcohol when change in color is needed. When the electric-light bulb is turned on at an edge of the plastic plate the white light from the bulb travels through a dye into the plastic plate changing its color to that of the dye just passed through. Then, the colored light entered the plastic plate meets with the grooves of letters or pictures before it reaches the opposing edge of the plastic plate. Upon meeting with the grooves the colored light refracts into air emitting the shiny colored rays of light. The grooves of letters or pictures are clearly viewed even during daylight hours when the plate is not illuminated by means of an adhesive color tape. The tape is sticked to the polished side of the plate following the grooved lines of letters or pictures cut in the opposite surface of the plate. When the plate is illuminated, the color tape produces a fantastic color blended by a colored light emitting from the grooves. A P.L.C. (programmable logic controller) controls the duration, interval, and sequence of illumination of the each one of bulbs. By using the illumination controller the colored lights, refracting from the grooves of the plate, will be blended together and produce a variety of colors when illumination time of each bulb is made overlapped. When the bulbs are turned on and off, fade-in, fade-out and overlapping phenomena are observed and produce a variety of colors making a display furthermore colorful.

The back part of the display board is used exactly for the same purpose as the front part is used. However, it is more often used in combination with the front part making good contrast to the front part. The back part is, as the name applies, positioned back of the front part. It has a few component parts as below.

A brick of transparent acrylic plastic which is used to form a larger panel of transparent acrylic plastic by fitting together a number of the bricks. The brick may be varied in size and shape depending on the letters, design, and pictures to be displayed. This brick of transparent acrylic plastic is hereafter called the brick. The larger panel made up by a number of the bricks and actually used for a display of letters, pictures, etc. is called the panel hereafter. Two edges of the brick are sandpapered. One edge is sandpapered to make the rays of incident light enter the edge to maximum extent and the other edge is sandpapered to have maximum diffusion of lights emerging from the edge.

An electric-light bulb with a reflector attached. The bulbs are used for illumination of the bricks. The position of a bulb and the shape of the reflector is same as described earlier. To produce a colored light an edge of the brick is colored with a desired dye.

A case that is made of a heatproof opaque material to prevent the rays of light projected to each brick from meddling. The inner surface of the case is coated with a reflective material to reflect light back to the brick. The case is made in mold one by one or many cases joining together in a pattern as desired. The front side of the case is the brick fitted in. This case contains bulb with reflector in it. The functions of the component parts are same as those explained for the plastic plate. The case which contains all component parts is a basic element of larger whole, the panel, that is used for an entire electric illumination of display. When the electric-bulb is turned on the light from the bulb travels into a colored edge of the brick and refracts into air at the opposite edge of the brick emitting shiny colored light. Two sides of the brick are sandpapered to insure the maximum luminous intensity of light getting into and out of the brick. The electric illuminant display by the panel is similar to a card display presented by spectators in a stadium using colored cards. Bricks are to the panel what cards are to the card display. The illumination time of each one of the bricks is controlled by a P.L.C. (programmable logic controller). This capability of illumination time control makes moving and blinking illumination possible. The illuminated part moves freely,—horizontally, vertically, diagonally, slowly or quickly at the same time blinking slowly or quickly.

BRIEF DESCRIPTION OF THE DRAWINGS

FIG. 5A is a partially horizontal section view of a plate showing the emerging lights.

FIG. 5B is a perspective view of a brick showing the emerging of the light.

FIG. 6 is a horizontal section view of a bulb with reflector of the present display board.

FIG. 7 is a horizontal view of the depths of grooves of a plate of the display board.

FIG. 9A is a perspective view of the panel which is gathered with a number of cases.

FIG. 9B is an enlarged view of the area designate "A" in FIG. 9A.

FIG. 10 is an enlarged and exploded section view of A in the FIG. 9.

DESCRIPTION OF THE PREFERRED EMBODIMENT

Figure 1:
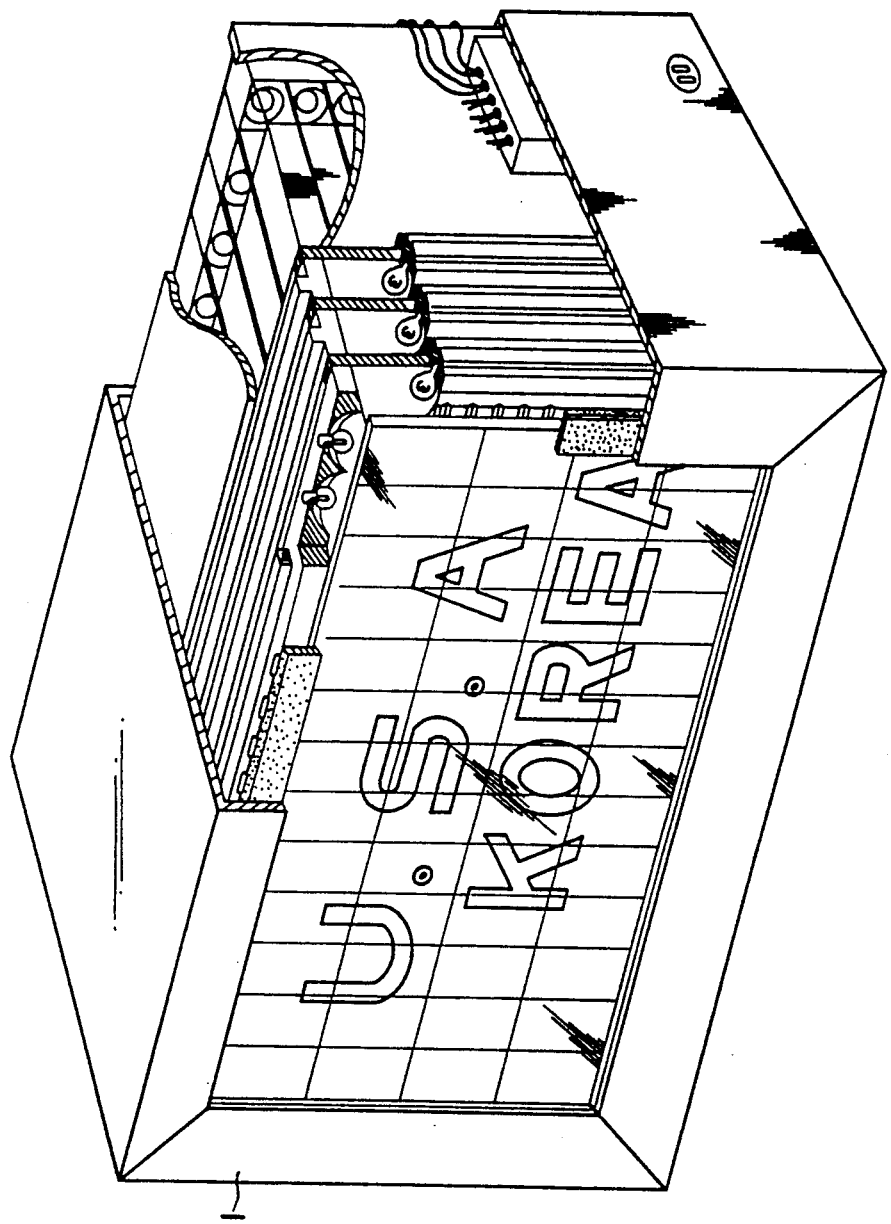
FIG. 1 is a perspective view, partially in fragmentary section, of the present display board.
Figure 2:
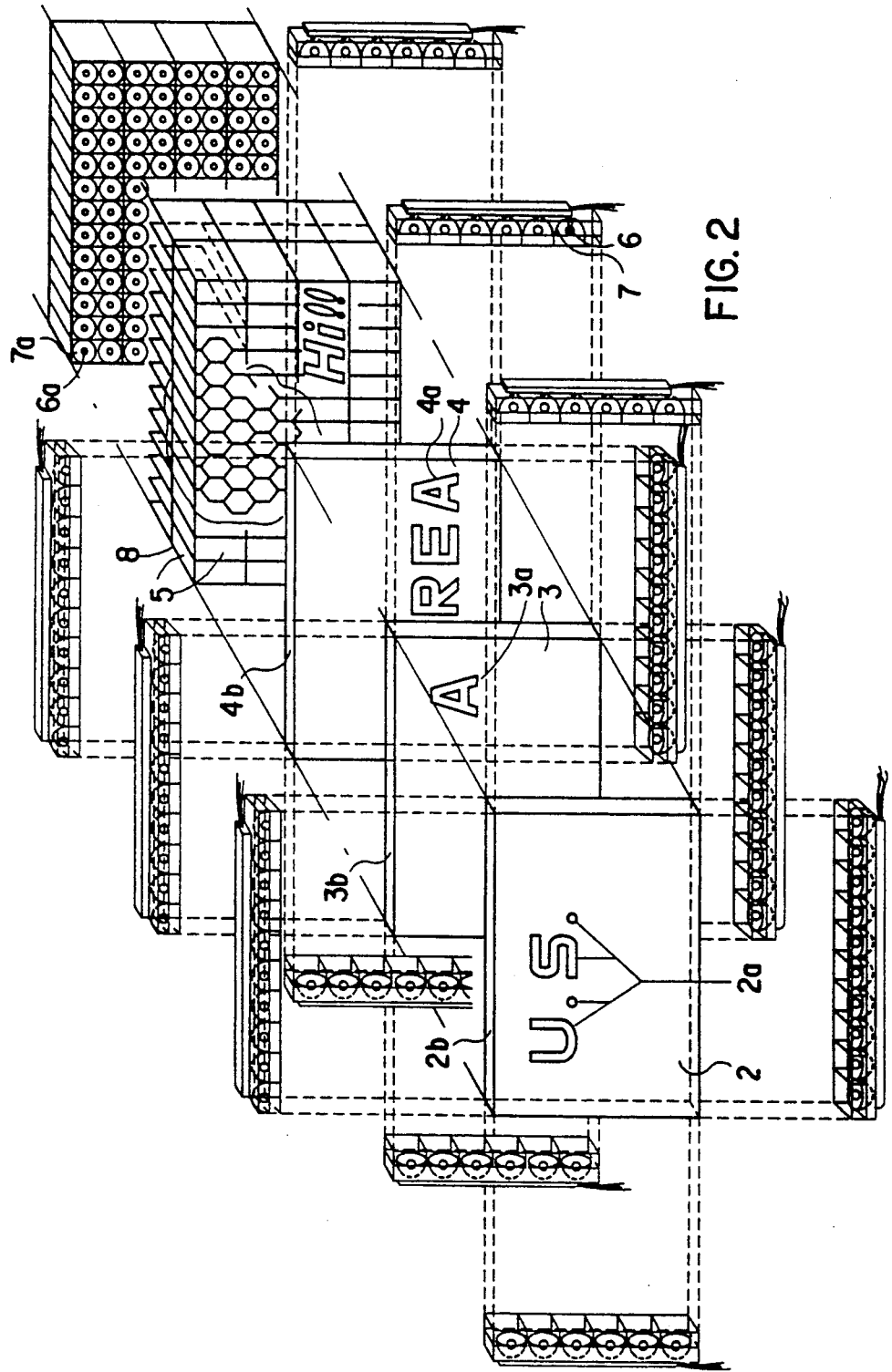
FIG. 2 is an exploded perspective view of the present display board.
Figure 3:
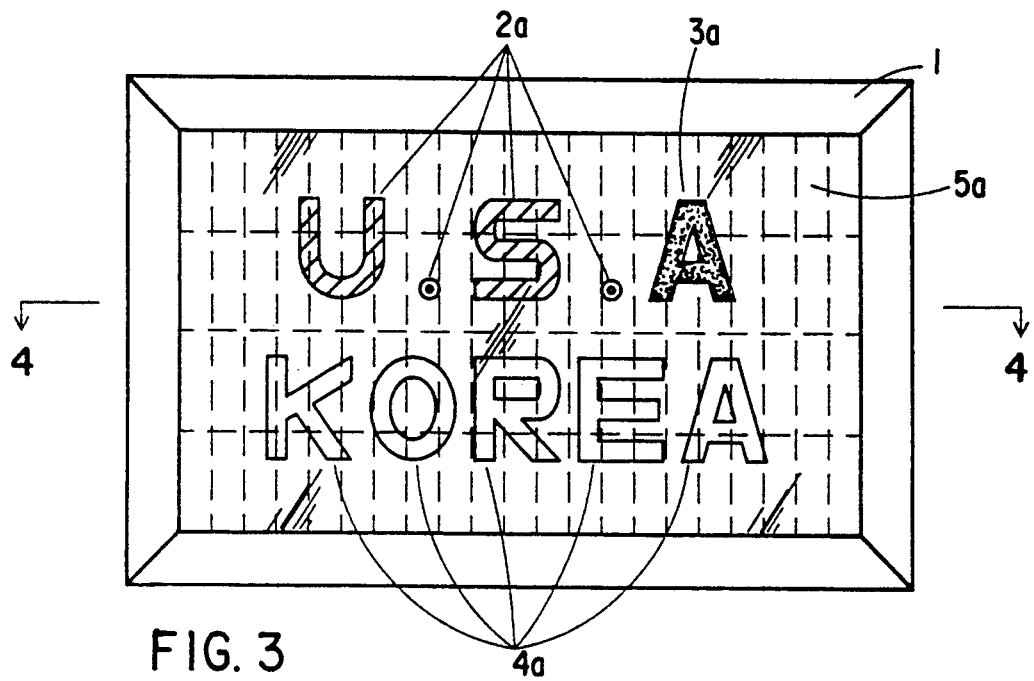
FIG. 3 is a front view of the present display board.
Figure 4:
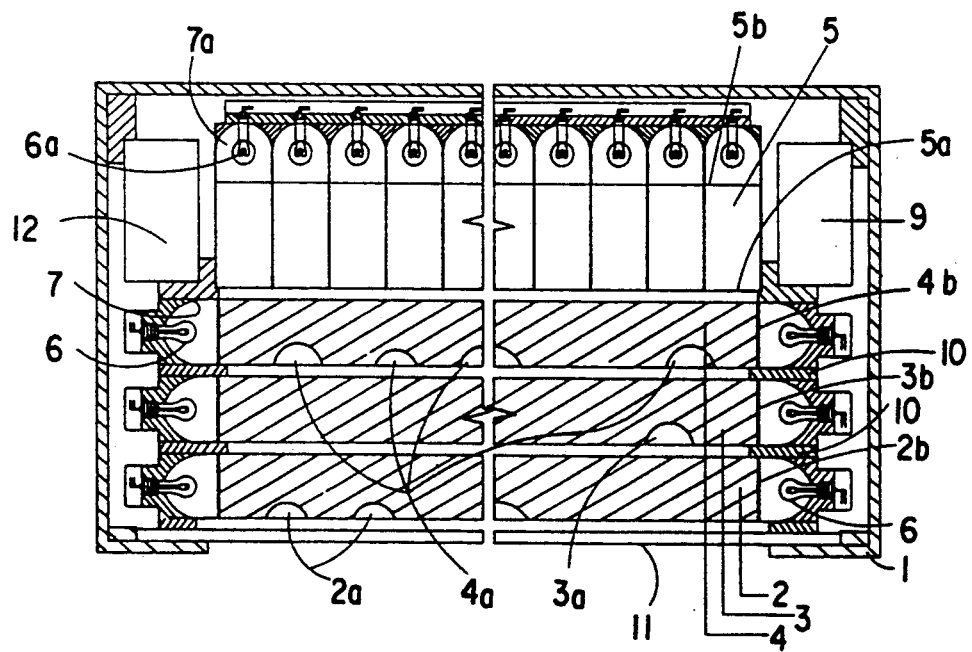
FIG. 4 is a horizontal section view taken on line 4—4 in the FIG. 3.
Figure 8:
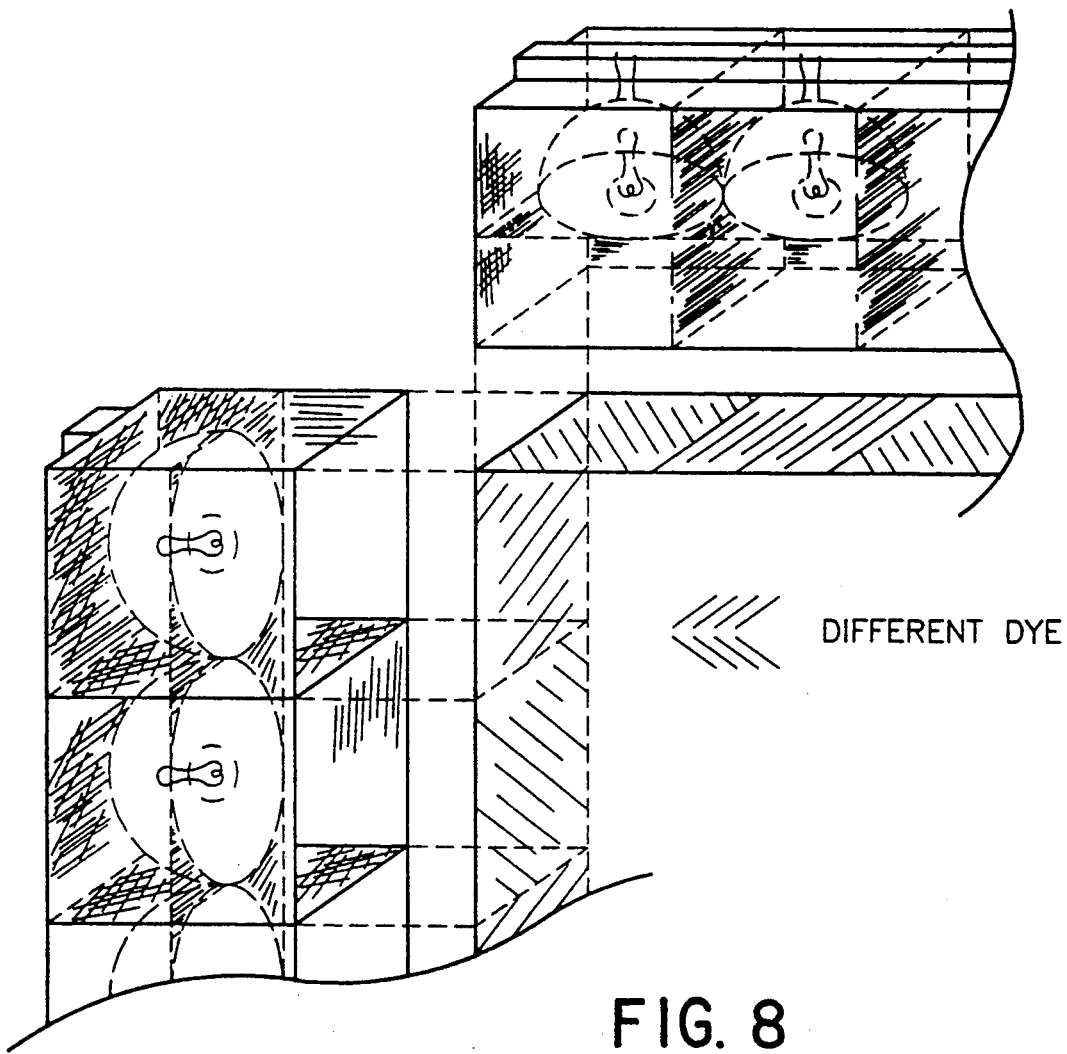
FIG. 8 is a partial perspective view of a corner part of a plate.

This invention, display board is surrounded and supported by a frame 1 as shown in FIG. 1. The major component parts are, the transparent acrylic plastic plates 2, 3, 4, in the FIG. 2, in which the desired letters or pictures are cut in, the transparent acrylic plastic brick 5 designed to provided flashing and blinking effect, the illumination bulbs 6, 6a, the reflectors 7, 7a, and a P.L.C. (programmable logic controller) 9 for illumination control. The illumination controller is located in the box 12 in the FIG. 4. The FIG. 4 shows two types of display board. One is a display board made of a transparent acrylic plastic plates 2,3,4 with grooves 2a, 3a, 4a of letters or pictures cut in its surface and the other one is a transparent acrylic plastic panel 8 made by joining together a number of bricks 5 of a plastic material to provide a blinking capability. The plates 2,3,4 have sandpapered edges where enter the rays of light from the bulbs 6 placed along the four edges of the each plate. The sandpapered edges are colored with a dye to produce a colored light. The colored lights entered into the plate through the colored edges travel straight or initiate total internal refraction inside the plate and emerge from the grooves cut in the surface of the plate emitting brilliant colored lights. The colored lights are able to come out of the plate from nowhere but from the grooves 2a, 3a4a in the FIG. 4 as shown the plate in the FIG. 5A. The brick 5 of plastic material has two sandpapered edges opposing each other. One of the edges is also colored with a desired dye 5b in the FIG. 4 to produce a color for the light passing the edge. The rays of light from the bulb 6a travel to the brick 5 passing through the one of the sandpapered and colored edges 5b, originate total internal refraction inside the brick and emerge from the other sandpapered edge 5a of the brick 5 as shown in the FIG. 5B. One edge 5b of the brick is sandpapered to make the light from a bulb 6a enter the brick to maximum extent and the other edge 5a is sandpapered to cause maximum diffusion of light at the edge 5a. The positions of the bulbs 6, 6a are an important factor to project the lights from the bulbs into the plate or into the brick to maximum degree and is shown in the FIG. 6. An illustration is made by using a total of three plates 2,3,4 with grooved letter, U.S., A, and KOREA respectively. The first plate 2 is grooved in its surface the letters 2a, U.S., properly spacing not to overlap the letter 3a, A, in the second plate 3. The letters 4a, KOREA, are grooved in the third plate 4 spaced properly in relation to the letters in the first and second plates. The four edges of plates 2, 3, 4 are either colored with a dye in a single color or in more than one colors. Here explanation is of the plates 2,3,4 with its four edges colored in a single color. The first plate 2 has its four edges colored with a green dye, the plate 3 has red edges and the plate 4 has yellow edges. When the plates are illuminated the letters 2a U.S., in the plate 2 are viewed in green and the letter 3a, A, in the plate 3 in red and the letters 4a, KOREA, in the plate 4 in yellow respectively. Thus the message "U.S.A KOREA" is shown in three different colors as shown in the FIG. 3. To display a message in a more colorful manner, the four edges of a plate are variegated with various dyes. In order to get the uniform distribution of light to all over the grooves when illuminated, the optimum depths of grooves are one fourth of the thickness of a plate around the periphery of the plate and one third of the thickness around the center of the plate as in the FIG. 7. Now explanation is of a brick 5 in the FIG. 4 that is a basic unit of a larger whole panel. The panel 8 is an illuminant display board used in combination with the plastic plates 2, 3, 4, to make the grooved letters or pictures in the surface of the plates more distinct and colorful by means of flashing and blinking illumination. A brick can be made small or large, and triangle, rectangle, hexagon or any shape and size as required. A number of cases containing bricks and bulbs with refractors make up a larger panel as a whole by fitting together as shown in the FIG. 9. The FIG. 10 shows the exploded view of division by the cases. When the bulb 6a in the FIG. 10 is turned on the rays of white light from the bulb enter the brick 5 through the edge 5b directly or reflecting back from the reflector 7a and emerge from the opposing edge 5a of the brick 5 originating total internal refraction inside the brick. The brick has two sandpapered edges; One is the edge 5b that light enters and the other is the edge 5a from which light emerges. The edge 5b is sandpapered to make the rays of incident light enter the edge to maximum degree and is also colored with a dye to produce a colored light as desired. The edge 5a of The brick 5 is sandpapered to bring forth brilliant diffused reflection of the colored light coming out of the edge. The panel 8 in the FIG. 2 is made up by fitting together a number of the bricks having their edges colored in a variety of colors. The panel is illuminated by turning on the bulbs 6a in the FIG. 10. The bulbs 6, 6a are turned on simultaneously or in sequence as programmed in advance by using a P.L.C. (programmable logic controller) 9 or the illumination controller 12 in the FIG. 4 for the functions of on-off, fade-in, fade-out and overlapping. In result, P.L.C. controls illumination of the panel 8 making it blinking and moving the illuminated part of the panel 8 horizontally, vertically and diagonally. The panel 8 is used either independently or in combination with any other signboard having a transparent surface such as plates 2, 3, 4, in the FIG. 2. When the panel 8 is used together with the signboard, it is placed in rear of the signboard. The flashing and blinking capability of the panel yields colorful background illumination in combination with the sign placed in front of it demonstrating its positive commercial value.

My claims are:

1. An illumination display board comprising at least one transparent acrylic plastic plate having edges sandpapered for maximizing incident light entering said sandpapered edges of said plate at said sandpapered edges, said sandpapered edges being colored with a dye for coloring said incident light entering said sandpapered edges, a plurality of light bulbs spaced around said sandpapered edges of said plastic plate for illuminating said plate through said sandpapered edges, a plurality of transparent acrylic plastic bricks having opposing sandpapered edges, one of said sandpapered edges of each of said bricks being colored with a dye for producing colored light in said each of said bricks and through the other of said sandpapered edges when said dye colored edge is illuminated from a light bulb, at least one light bulb at said dye colored edge of each of said bricks for illuminating said bricks from said sandpapered and dye colored edges, said other of said sandpapered edges of said bricks facing said transparent acrylic plate intermediate the edges of said sandpapered edges of said plate for causing diffused reflection of said colored light emerging from said sandpapered edges of said other of said opposite sandpapered edges of said bricks through said plastic plate, said plastic plate having grooves cut into the surface of said plastic plate, said grooves in the surface of said plate adjacent the center of said plate being about one third the thickness of said plate and said grooves in said surface of said plate adjacent the periphery of said plate being about one quarter said thickness of said plate.

2. An illumination display board, as recited in claim 1, wherein each of said light bulbs spaced around said sandpapered edges of said plastic plate is positioned at a point where a straight line extending through the center of the edge of said plate and perpendicular to said edge intersects with straight lines at 42° with the surface of said edge at the end of said edges where the rays of incident light from said bulb enter said plate.

3. An illumination display board, as recited in claim 2, wherein each of said light bulbs is in a semicircular reflector with the diameter of said reflector equal to the thickness of said acrylic plastic plate, the reflectors of said light bulbs being connected to the edge of said plate through a rectangular shaped box, the inner surfaces of said box being coated with a reflector material.

* * * * *

UNITED STATES PATENT AND TRADEMARK OFFICE
CERTIFICATE OF CORRECTION

PATENT NO. : 5,124,890

DATED : June 23, 1992

INVENTOR(S) : CHOI et al

It is certified that error appears in the above-identified patent and that said Letters Patent is hereby corrected as shown below:

On the title page, Item [76], line 5, "Dangdong-Ku" should read --Kangdong-Ku--.

Signed and Sealed this

Twentieth Day of July, 1993

Attest:

MICHAEL K. KIRK

Attesting Officer

Acting Commissioner of Patents and Trademarks